Patented June 16, 1953

2,642,411

UNITED STATES PATENT OFFICE 2,642,411

PROCESS FOR PREPARING POLYMETHYL SILOXANES AND PRODUCT

Pierre Jean Chevalier, Lyon, France, assignor to Societe Des Usines Chimiques Rhone-Poulenc, Paris, France, a French body corporate No Drawing. Application November 28, 1949, Serial No. 129,883. In France December 7, 1948

4 Claims. (Cl. 260—46.5)

This invention relates to organosilicic resin compositions and to the application thereof in industry.

In co-pending application Serial No. 129,881 filed on even date herewith processes are described for the production of new fluid methyl polysiloxanes which have a $CH_3:Si$ ratio of at most 1.4, which contain from 8 to 20 silicon atoms in the polysiloxane molecule, which boil at temperatures of from 120° to 250° C. under a pressure of 8 mm. of mercury and which gel under the action of lead naphthenate. These new fluid methyl polysiloxanes can be obtained by distilling under reduced pressure methyl polysiloxane resins having a $CH_3:Si$ ratio lower than or at the most equal to 1.4, such resins being prepared by hydrolysis at room temperature of an ethereal solution of methyl chlorsilanes. These new fluid methyl polysiloxanes, as described in the said copending application, can be used to advantage as a substitute for methyl polysiloxane resins for many purposes.

The $CH_3:Si$ ratio referred to above is the ratio of methyl groups to silicon atoms in the molecule. In order to avoid any ambiguity in the present description, it is to be understood that the term "resin" designates a product of the character which results directly from the hydrolysis of methyl chlorsilanes without separation of any of the components of the product. The term "fluid methyl polysiloxanes" designates the substances of a lower degree of condensation, having the physical properties defined above, which form the subject of said co-pending patent application.

According to the present invention new and valuable organosilicic resin compositions comprise mixtures of methyl polysiloxane resins having a $CH_3:Si$ ratio of at most 1.4 with at least 30% of their weight of fluid methyl polysiloxanes. The said compositions differ from the usual methyl polysiloxane resins which have not been treated to separate constituents of low degree of condensation in that the proportion of fluid methyl polysiloxanes is substantially higher than is ever present in such resins as they are normally prepared. The new compositions have the advantageous properties of the fluid methyl polysiloxanes alone in that they are fluid, they may be gelled at room temperature by the action of small quantities of lead naphthenate and they are stable on storage.

The new compositions may be prepared by adding fluid methyl polysiloxanes to methyl polysiloxane resins (the latter may or may not already contain a certain proportion of unseparated fluid methyl polysiloxanes). An alternative method of preparation consists in hydrolysing an ethereal solution of methyl chlorsilanes by means of a moderate quantity of water initially at room temperature, for example between 1 and 10 times the quantity theoretically necessary for the hydrolysis of the methylchlorsilanes since in this way a fluid product is obtained which consists of a methyl polysiloxane resin already containing 30% or more of fluid methyl polysiloxanes. The quantity of water theoretically necessary for the hydrolysis of the chlorsilanes is 1 molecule of water for each 2 atoms of chlorine.

The organosilicic resin compositions of this invention can be used as substitutes both for the fluid methyl polysiloxanes of the co-pending application, and also for the usual methyl polysiloxane resins, for a great number of purposes, for example for the manufacture of mouldable compositions.

The following examples, in which the parts are by weight, will serve to illustrate the invention but are not to be regarded as limiting it in any way.

Example I

A solution of 435 parts of a mixture of methyl chlorsilanes having a $CH_3:Si$ ratio equal to 1.25 in 1500 parts of ether is poured into 375 parts of water at room temperature and the ether vaporized by the reaction is condensed and returned into the apparatus. The ethereal layer is separated and the ether evaporated off, leaving a resin from which, by distillation under reduced pressure, 45% of its weight of fluid methyl polysiloxane distilling at 120° to 250° C. under pressure of 8 mm. of mercury can be separated. The resin is fluid owing to its high content of fluid methyl polysiloxane and remains fluid even on prolonged storage in the absence of solvent.

Example II

A methyl polysiloxane resin is obtained by adding 2250 parts of water to a solution of 868 parts of methyl chlorsilanes (having a $CH_3:Si$ ratio equal to 1.25) in 1050 parts of ether, isolating the ethereal layer and evaporating off the ether. To 100 parts of the resin are added 20 parts of fluid methyl polysiloxanes obtained by distillation under reduced pressure of the crude resin prepared in accordance with the foregoing Example I. A fluid composition is obtained, which contains more than 30% of fluid methyl polysiloxanes and which can be preserved for several months in the absence of any solvent without any appreciable increase in its viscosity. It can be used as a substitute for the usual methyl polysiloxane resins in the majority of their applications.

I claim:

1. A process for the production of fluid compositions of matter which comprises hydrolysing a solution in diethyl ether of methyl halogenosilanes having a $CH_3:Si$ ratio of at most 1.4 by pouring the said solution into a quantity of liquid water at room temperature equal to 1 to 10 times the quantity theoretically necessary for the hydrolysis; the said methyl halogenosilanes being the sole halogenosilane employed, the said liquid water being the sole hydrolysing agent employed, and the diethyl ether being the sole organic solvent present; condensing and returning the ether vaporized by the reaction to the hydrolysed solution; separating the diethyl ether layer from the aqueous layer and recovering by evaporation of said ether a liquid composition of matter consisting essentially of a mixture of methyl polysiloxanes having a $CH_3:Si$ ratio of at most 1.4, 30 to 45% of the weight of which consists of methyl polysiloxanes which have a $CH_3:Si$ ratio of at most 1.4, which contain 8 to 20 silicon atoms in the polysiloxane molecule, which boil at 120 to 250° C., under a pressure of 8 mm. of mercury, and which gel under the action of lead naphthenate at room temperature.

2. A liquid composition of matter produced by the process which comprises hydrolysing a solution in diethyl ether of methyl halogenosilanes having a $CH_3:Si$ ratio of at most 1.4 by pouring the said solution into a quantity of liquid water at room temperature equal to 1 to 10 times the quantity theoretically necessary for the hydrolysis; the said methyl halogenosilanes being the sole halogenosilanes employed, the said liquid water being the sole hydrolysing agent employed, and the diethyl ether being the sole organic solvent present; condensing and returning the ether vaporized by the reaction to the hydrolysed solution; separating the diethyl ether layer from the aqueous layer and recovering by evaporation of said ether liquid composition of matter consisting essentially of a mixture of methyl polysiloxanes having a $CH_3:Si$ ratio of at most 1.4, 30 to 45% of the weight of which consists of methyl polysiloxanes which have a $CH_3:Si$ ratio of at most 1.4, which contain 8 to 20 silicon atoms in the polysiloxane molecule, which boil at 120 to 250° C., under a pressure of 8 mm. of mercury, and which gel under the action of lead naphthenate at room temperature.

3. A process for the production of fluid compositions of matter which comprises hydrolysing a solution in diethyl ether of methyl halogenosilanes having a $CH_3:Si$ ratio between 1.25 and 1.4 by pouring the said solution into a quantity of liquid water at room temperature equal to 1 to 10 times the quantity theoretically necessary for the hydrolysis; the said methyl halogenosilanes being the sole halogenosilanes employed, the said liquid water being the sole hydrolysing agent employed, and the diethyl ether being the sole organic solvent present; condensing and returning the ether vaporized by the reaction to the hydrolysed solution; separating the diethyl ether layer from the aqueous layer and recovering by evaporation of said ether a liquid composition of matter consisting essentially of a mixture of methyl polysiloxanes having a $CH_3:Si$ ratio between 1.25 and 1.4, 30 to 45% of the weight of which consists of methyl polysiloxanes which have a $CH_3:Si$ ratio between 1.25 and 1.4, which contain 8 to 20 silicon atoms in the polysiloxane molecule, which boil at 120 to 250° C., under a pressure of 8 mm. of mercury, and which gel under the action of lead naphthenate at room temperature.

4. A liquid composition of matter produced by the process which comprises hydrolysing a solution in diethyl ether of methyl halogenosilanes having a $CH_3:Si$ ratio between 1.25 and 1.4 by pouring the said solution into a quantity of liquid water at room temperature equal to 1 to 10 times the quantity theoretically necessary for the hydrolysis; the said methyl halogenosilanes being the sole halogenosilanes employed, the said liquid water being the sole hydrolysing agent employed, and the diethyl ether being the sole organic solvent present; condensing and returning the ether vaporized by the reaction to the hydrolysed solution; separating the diethyl ether layer from the aqueous layer and recovering by evaporation of said ether a liquid composition of matter consisting essentially of a mixture of methyl polysiloxanes having a $CH_3:Si$ ratio between 1.25 and 1.4, 30 to 45% of the weight of which consists of methyl polysiloxanes which have a $CH_3:Si$ ratio between 1.25 and 1.4, which contain 8 to 20 silicon atoms in the polysiloxane molecule, which boil at 120 to 250° C., under a pressure of 8 mm. of mercury, and which gel under the action of lead naphthenate at room temperature.

PIERRE JEAN CHEVALIER.

References Cited in the file of this patent

UNITED STATES PATENTS

| Number | Name | Date |
| --- | --- | --- |
| 2,258,218 | Rochow | Oct. 7, 1941 |
| 2,389,477 | Wright et al. | Nov. 20, 1945 |
| 2,398,672 | Sauer | Apr. 16, 1946 |
| 2,405,041 | Mathes et al. | July 30, 1946 |
| 2,449,572 | Welsh | Sept. 21, 1948 |
| 2,465,188 | Barry et al. | Mar. 22, 1949 |
| 2,477,330 | Doyle | July 26, 1949 |
| 2,499,865 | Iler | Mar. 7, 1950 |
| 2,501,525 | Krieble et al. | Mar. 21, 1950 |
| 2,516,047 | De Coste | July 18, 1950 |
| 2,584,835 | Biduad | Feb. 2, 1952 |

OTHER REFERENCES

Patnode et al., Journ. Amer. Chem. Soc., vol. 68, March 1946, pp. 358 to 363.